United States Patent
Yoon et al.

(10) Patent No.: US 8,525,912 B2
(45) Date of Patent: Sep. 3, 2013

(54) METHOD AND APPARATUS FOR PHOTOGRAPHING AN IMAGE OF DIGITAL CAMERA IN A MOBILE COMMUNICATION TERMINAL

(75) Inventors: Young-Kwon Yoon, Seoul (KR); Min-Jung Kim, Yongin-si (KR); Jae-Hyun Park, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 872 days.

(21) Appl. No.: 12/580,794

(22) Filed: Oct. 16, 2009

(65) Prior Publication Data

US 2011/0090388 A1 Apr. 21, 2011

(51) Int. Cl.
*H04N 5/222* (2006.01)

(52) U.S. Cl.
USPC .............................. 348/333.01; 348/333.02

(58) Field of Classification Search
USPC ....................................... 348/333.01–333.02
See application file for complete search history.

(56) References Cited

U.S. PATENT DOCUMENTS

| | | | | |
|---|---|---|---|---|
| 4,928,137 | A * | 5/1990 | Kinoshita | 348/297 |
| 4,945,424 | A * | 7/1990 | Hiroki et al. | 386/200 |
| 7,408,586 | B2 | 8/2008 | Ueda et al. | |
| 7,598,995 | B2 * | 10/2009 | Yamaya | 348/333.02 |
| 2005/0007476 | A1 | 1/2005 | Miyake | |

FOREIGN PATENT DOCUMENTS

| | | |
|---|---|---|
| JP | 2005-020397 | 1/2005 |
| JP | 2009-201153 | 9/2009 |
| KR | 1020020089673 | 11/2002 |
| KR | 1020030090889 | 12/2003 |
| WO | WO 2007/066578 | 6/2007 |

* cited by examiner

*Primary Examiner* — Ngoc-Yen Vu
(74) *Attorney, Agent, or Firm* — The Farrell Law Firm, P.C.

(57) ABSTRACT

A method is provided for photographing an image in a digital camera. The method includes, upon power-on of the camera, disabling a camera function unit that photographs and processes an image, and displaying a preset screen; enabling the camera function unit and displaying a preview screen, if a key for displaying a preview screen is input; stopping displaying the preview screen by disabling the camera function unit, if the key for displaying a preview screen is released; and enabling the camera function unit and performing photographing, if a key for photographing is input.

3 Claims, 6 Drawing Sheets

METHOD AND APPARATUS FOR PHOTOGRAPHING AN IMAGE OF DIGITAL CAMERA IN A MOBILE COMMUNICATION TERMINAL

BACKGROUND OF THE INVENTION

1. Field of the Invention

The present invention relates generally to a digital camera, and more particularly, to a method and apparatus for photographing an image in a digital camera mounted in a mobile communication terminal.

2. Description of the Related Art

The latest portable mobile devices have a variety of functions integrated therein, and a digital camera is one of the typical examples. The conventional camera is limited in its use, as it is an analog camera that records an image of a subject on a film. Recently, however, due to the development of semiconductor technology, it is possible to apply miniaturized camera modules for converting an image of a subject into electric data to a variety of small products using image sensors manufactured by the semiconductor process. Accordingly, a digital camera may be mounted in a portable mobile device as a small module.

The integration of a camera and a mobile phone or other mobile communication devices has increased utilization of the camera. A camera mounted in a mobile phone may transmit photographed images to other users through mobile communication using Mobile Messaging Service (MMS), or transmit and output captured images to different output devices through short-range communication such as Bluetooth or Infrared communication, and may be widely used in, for example, immediately uploading photographed images to the Internet through a communication network to share them with others.

A small digital camera mounted in a mobile terminal generally uses a power supply of the mobile terminal, without having its independent power supply. Small devices, such as a mobile communication terminal and a portable mobile device, essentially require a method for minimizing power consumption required in order to increase their utilization.

Accordingly, the small digital camera mounted in a mobile terminal also requires a photographing scheme different from the conventional one, which consumes less power compared with the ordinary digital cameras.

Digital cameras, cell phones, camcorders and the like have a preview screen that provides an image of a subject in real time in order to help users previously view an image to be photographed, prior to photographing the subject. Generally, in such a preview mode, an image of a subject should be provided to a display unit in real time using a lens unit and an image sensor, and an operation for setting an automatic focus function or an automatic white balance function is performed in real time, increasing the power consumption.

SUMMARY OF THE INVENTION

An aspect of the present invention provides a photographing method and apparatus suitable for a small digital camera mounted in a mobile communication terminal.

According to one aspect of the present invention, there is provided a method for photographing an image in a digital camera. The method includes, upon power-on of the camera, disabling a camera function unit that photographs and processes an image, and displaying a preset screen; enabling the camera function unit and displaying a preview screen, if a key for displaying a preview screen is input; stopping displaying the preview screen by disabling the camera function unit, if the key for displaying a preview screen is released; and enabling the camera function unit and performing photographing, if a key for photographing is input.

According to another aspect of the present invention, there is provided a digital camera for photographing an image. The digital camera includes a lens unit for forming an optical image of a subject on an image sensor; the image sensor with a plurality of photo detectors integrated as individual pixels, for converting image information of a subject into electrical data; an Image Signal Processor (ISP) for processing an image signal received from the image sensor; a display unit for displaying a preview screen and a photographed image; a storage for storing the photographed image and data needed to operate the digital camera; an input unit with a key for photographing and a key for displaying a preview screen, for receiving a user input; and a controller for, upon power-on of the camera, disabling a camera function unit that includes the lens, the image sensor and the ISP, and displaying a preset screen on the display unit; enabling the camera function unit and displaying the preview screen, if the key for displaying a preview screen is input; stopping displaying the preview screen by disabling the camera function unit, if the key for displaying a preview screen is released; and enabling the camera function unit and performing photographing, if the key for photographing is input.

BRIEF DESCRIPTION OF THE DRAWINGS

The above and other aspects, features and advantages of certain exemplary embodiments of the present invention will be more apparent from the following description taken in conjunction with the accompanying drawings, in which.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention.

In addition, descriptions of well-known functions and constructions are omitted for clarity and conciseness.

Figure 1:
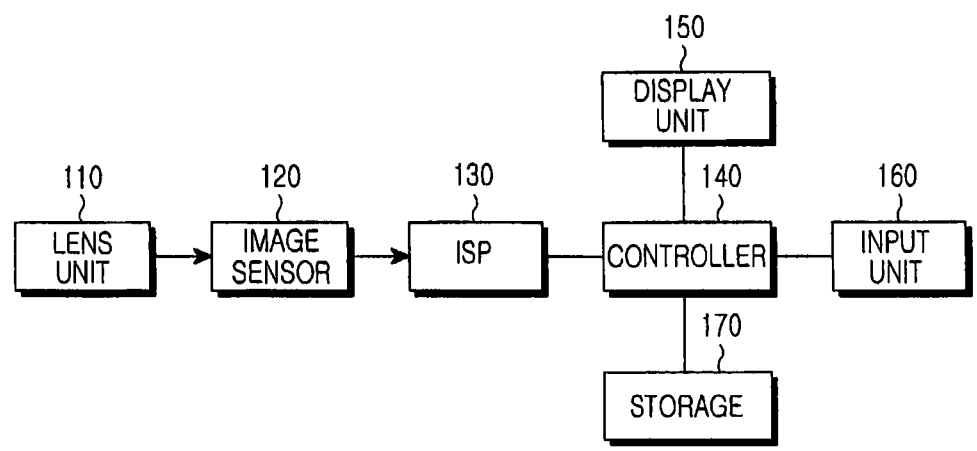
FIG. 1 is a diagram illustrating a structure of a digital camera according to an embodiment of the present invention.

FIG. 1 illustrates a structure of a digital camera according to an embodiment of the present invention.

The digital camera in FIG. 1 may be mounted in a mobile communication terminal. In this case, components of the digital camera may be provided in the mobile communication terminal. Referring to FIG. 1, the digital camera includes a lens unit 110, an image sensor 120, an Image Signal Processor (ISP) 130, a controller 140, a display unit 150, an input unit 160, and a storage 170. In this specification, a set of the lens unit 110, the image sensor 120 and the ISP 130, for photographing and processing images, is referred to as a camera function unit (not shown).

The lens unit 110 forms an optical image of a subject on the image sensor 120. The lens unit 110 includes a zoom lens (not shown), and a focus lens (not shown) that can move along an optical axis to adjust a focus of the optical image formed on the image sensor 120. A digital image of the subject that a user desires to photograph is acquired using the lens unit 110.

The image sensor 120 may include a Complementary Metal-Oxide Semiconductor (CMOS) or a Charge Coupled Device (CCD). The image sensor 120, which has a plurality of photo detectors integrated as individual pixels, converts image information of a subject into electric data and delivers the electric data to the ISP 130.

The ISP 130 processes an image signal received from the image sensor 120 on a frame-by-frame basis.

The display unit 150, under the control of the controller 140, displays photographed images and a setting screen needed for photographing, or a screen for user's operation selection. According to an embodiment of the present invention, the display unit 150 displays a preview screen if a preview key (or a key for displaying a preview) is input, and displays a pop-up screen and/or a preset animation or image if a photo key (or a key for photographing) is input.

The storage 170 stores data needed to operate the digital camera. In accordance with an embodiment of the present invention, the storage 170 stores a pop-up screen and/or an animation or an image, which are to be displayed on the display unit 150 if the photo key is input.

The input unit 160 receives a user input and delivers it to the controller 140. If the display unit 150 is realized with a touch screen, the display unit 150 may also serve as the input unit 160. The digital camera according to an embodiment of the present invention includes a photo key for performing photographing, and may further include a preview key for displaying a preview screen.

The controller 140 controls respective components of the digital camera. In an embodiment of the present invention, upon power-on of the camera, the controller 140 displays a preset background screen or wallpaper, with the camera function unit (with the lens unit 110, the image sensor 120 and the ISP 130) maintaining in an 'Off' state. If the preview key or the photo key is input by the user, the controller 140 switches the lens unit 110, the image sensor 120 and the ISP 130 to an 'On' state, and displays a preview screen or performs image photographing using the display unit 150.

In second and third embodiments of the present invention, during an initialization operation for image capturing, the controller 140 displays on the display unit 150 a preset animation, a preset image, or a pop-up window asking whether to perform photographing. If a photo key input is recognized as a long-key input as the photo key input lasts a preset time or longer while the preset animation is being displayed by the photo key input, the controller 140 performs photographing after displaying an animation describing the execution of photographing. In order for the photo key input to be recognized as a long-key input, the photo key input should continues for a preset time or longer, which may be preferably set as 100-400 ms.

The digital camera may further include a buffer (not shown) for temporarily storing photographed images.

Figure 2:
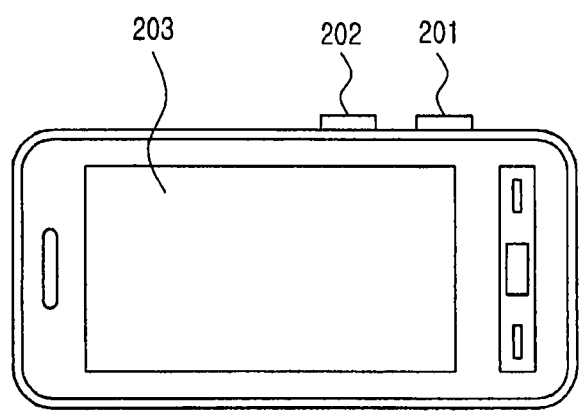
FIG. 2 is a view illustrating an example of a mobile communication terminal in which a digital camera is mounted according to an embodiment of the present invention.

FIG. 2 illustrates a mobile communication terminal in which a digital camera is mounted according to an embodiment of the present invention. As shown in FIG. 2, in the mobile communication terminal with a digital camera, a display 203 may serve as the display unit 150 in the camera, and function keys 201 and 202 of the mobile communication terminal may be set as the photo key for image photographing and the preview key for displaying a preview screen in the camera, respectively.

Figure 3:
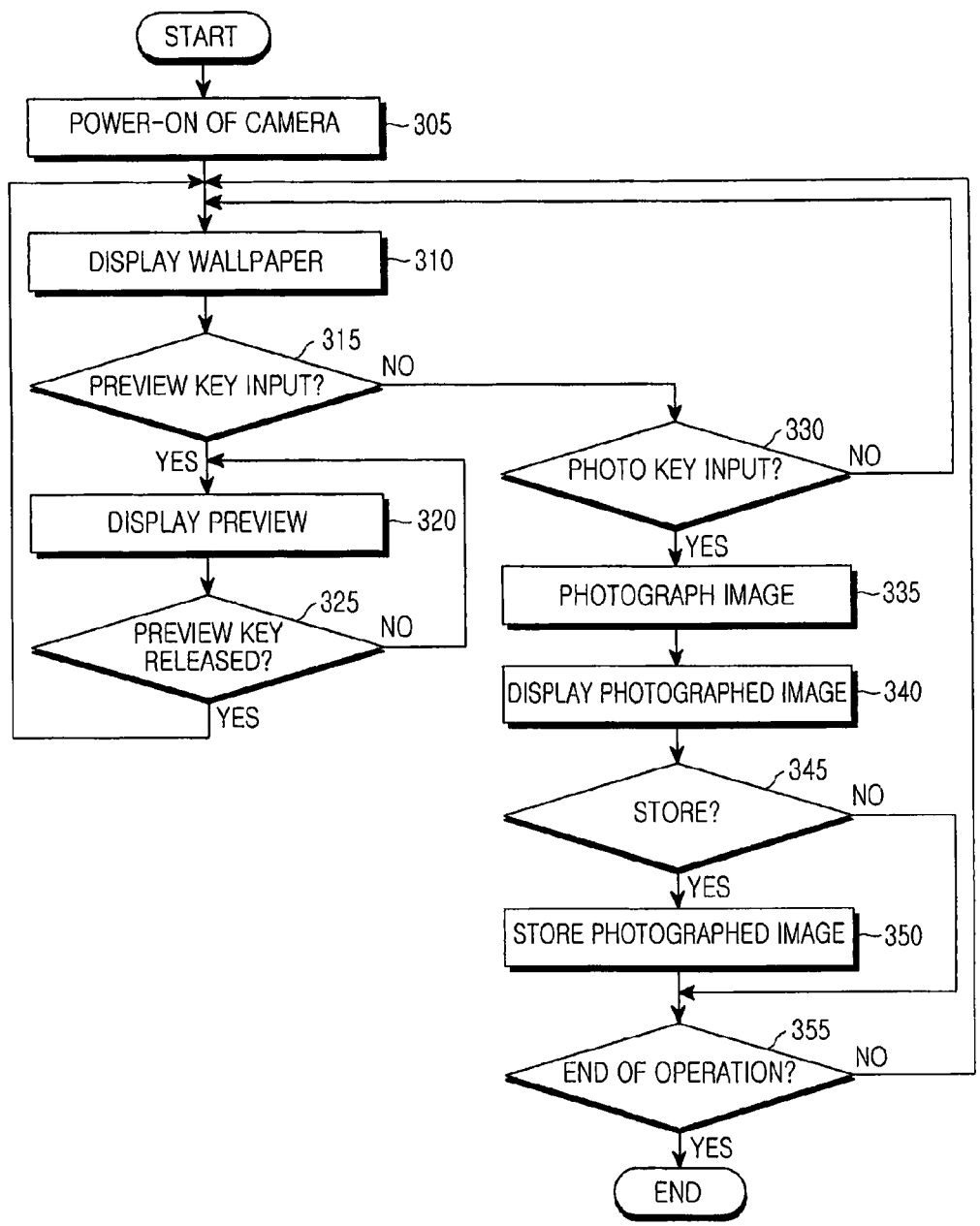
FIG. 3 is a flowchart illustrating a photographing operation of a digital camera according to a first embodiment of the present invention.

FIG. 3 illustrates a photographing operation of a digital camera according to a first embodiment of the present invention. In the first embodiment of the present invention, according to features of the present invention, a preview key is newly set to display a preview only when the user needs it, without always displaying a preview screen during camera photographing as in the conventional digital camera. Therefore, when the user intends to display a preview screen, he can display the preview screen by pressing the preview key. Thereafter, the user may perform photographing by pressing the photo key when he desires to perform photographing.

Referring to FIG. 3, if the camera is powered on or enters a camera mode in step 305, the controller 140 displays a preset background screen on the display unit 150 in step 310. The displayed background screen may be set by the user, and in order to minimize power consumption, the controller 140 may turn off the display unit 150 so that nothing is displayed. In this case, the lens unit 110, the image sensor 120 and the ISP 130 of the camera are turned off.

In step 315, the controller 140 determines whether a preview key is input. If the preview key is input in step 315, the controller 140 turns on the lens unit 110, the image sensor 120 and the ISP 130, and displays a preview screen on the display unit 150 in step 320. In step 325, the controller 140 determines whether the preview key is released. If the preview key is not released in step 325, the controller 140 continuously displays the preview screen in step 320. If the preview key is released in step 325, the controller 140 turns off the lens unit 110, the image sensor 120 and the ISP 130 and re-displays the background screen in step 310.

If the preview key is not input in step 315, the controller 140 determines in step 330 whether a photo key is input by the user. If the photo key is not input in step 330, the controller 140 continuously displays the background screen in step 310, maintaining the 'Off' state of the lens unit 110, the image sensor 120 and the ISP 130. If the photo key is input in step 330, the controller 140 switches the lens unit 110, the image sensor 120 and the ISP 130 to the 'On' state and photographs an image in step 335. Thereafter, in step 340, the controller 140 displays the photographed image on the display unit 150. In step 345, the controller 140 determines whether to store the photographed image. If it is determined to store the photographed image, the controller 140 stores the photographed image in the storage 170 in step 350, and then proceeds to step 355. If it is determined not to store the photographed image, the controller 140 proceeds to step 355 after clearing the buffer (not shown). In step 355, the controller 140 determines whether to end the operation. If it is determined not to end the operation, the controller 140 re-displays the background screen in step 310. Otherwise, the controller 140 ends the operation.

Figure 4:
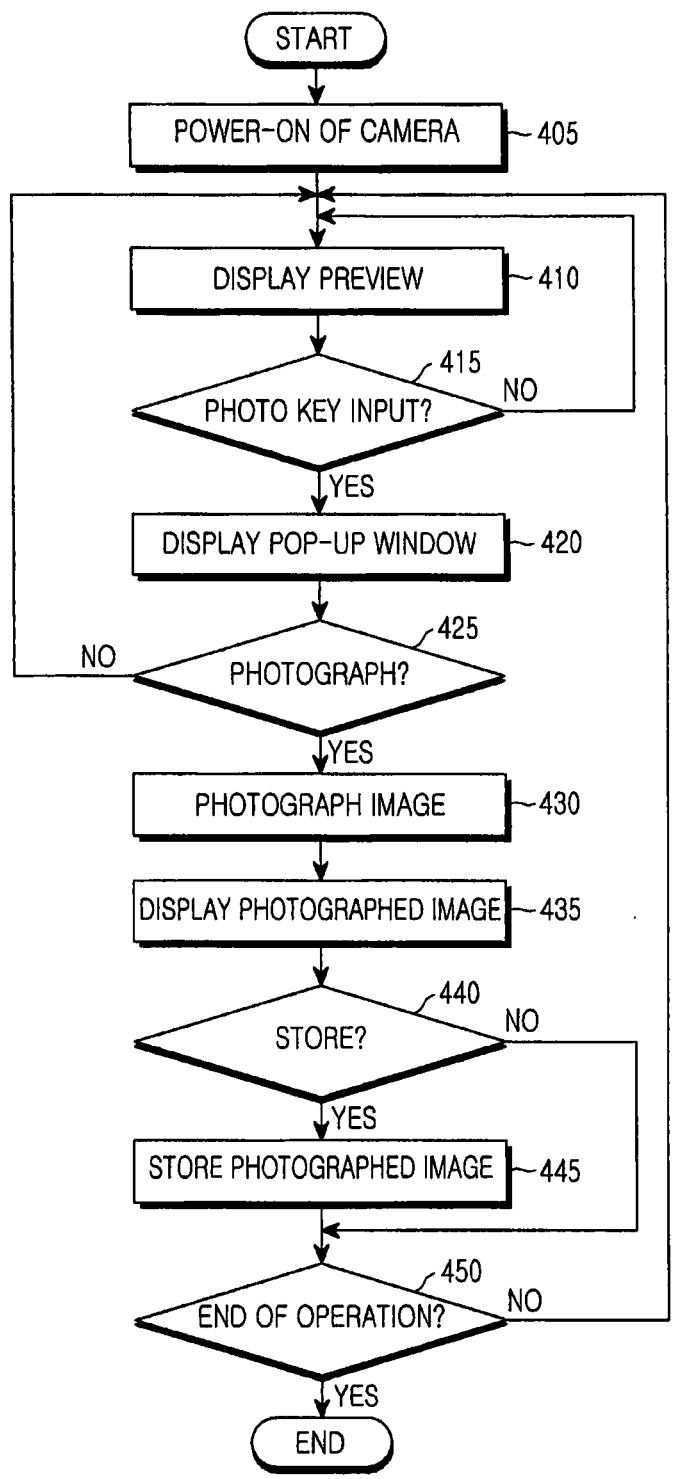
FIG. 4 is a flowchart illustrating a photographing operation of a digital camera according to a second embodiment of the present invention.

FIG. 4 illustrates a photographing operation of a digital camera according to a second embodiment of the present invention. The second embodiment of the present invention displays a pop-up window asking whether to perform photographing if a photo key is input for image photographing, and stops displaying a preview screen and performs an initialization operation for image photographing while the pop-up window is being displayed.

Referring to FIG. 4, if the camera is powered on or enters a camera mode in step 405, the controller 140 displays a preview screen on the display unit 150 in step 410. In this embodiment, the digital camera has no separate preview key. However, as in the first embodiment, a separate preview key may be set so that a preview is displayed only when the preview key is pressed.

Figure 5:
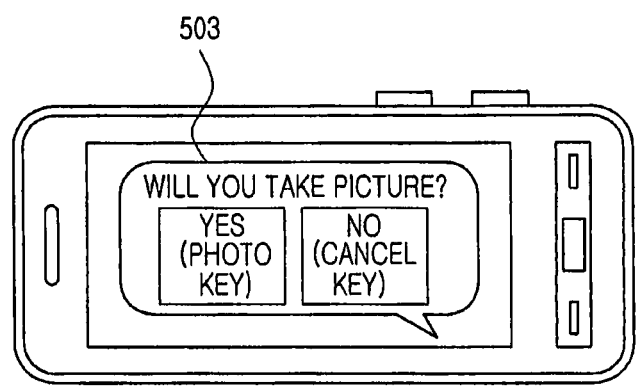
FIG. 5 is a view illustrating an example of a pop-up window displayed on a display unit during a photographing operation of a digital camera according to the second embodiment of the present invention.

In step 415, the controller 140 determines whether a photo key is input by the user. If the photo key is not input, the controller 140 continuously displays the preview screen in step 410. If the photo key is input, the controller 140 displays a pop-up window asking whether to perform photographing in step 420. In this case, the pop-up window may be displayed as shown in FIG. 5. FIG. 5 illustrates an example of a pop-up window displayed on the display unit during a photographing operation of a digital camera according to the second embodiment of the present invention. While the pop-up window 503 is displayed, photographing is performed if the user presses the photo key once again, and photographing is canceled if the user presses a cancel key. The preview screen is not displayed while the pop-up window 503 is displayed.

In step 425, the controller 140 determines whether a response to the pop-up window is to perform photographing. If it is determined not to perform photographing in step 425, the controller 140 proceeds to step 410. However, if it is determined to perform photographing in step 425, the controller 140 photographs an image in step 430. The controller 140 displays the photographed image on the display unit 150 in step 435, and determines in step 440 whether to store the photographed image. If it is determined to store the photographed image, the controller 140 stores the photographed image in the storage 170 in step 445 and then proceeds to step 450. If it is determined not to store the photographed image, the controller 140 proceeds to step 450 after clearing the buffer (not shown). In step 450, the controller 140 determines whether to end the operation. If it is determined not to end the operation, the controller 140 re-displays the preview screen in step 410. Otherwise, the controller 140 ends the operation.

Figure 6:
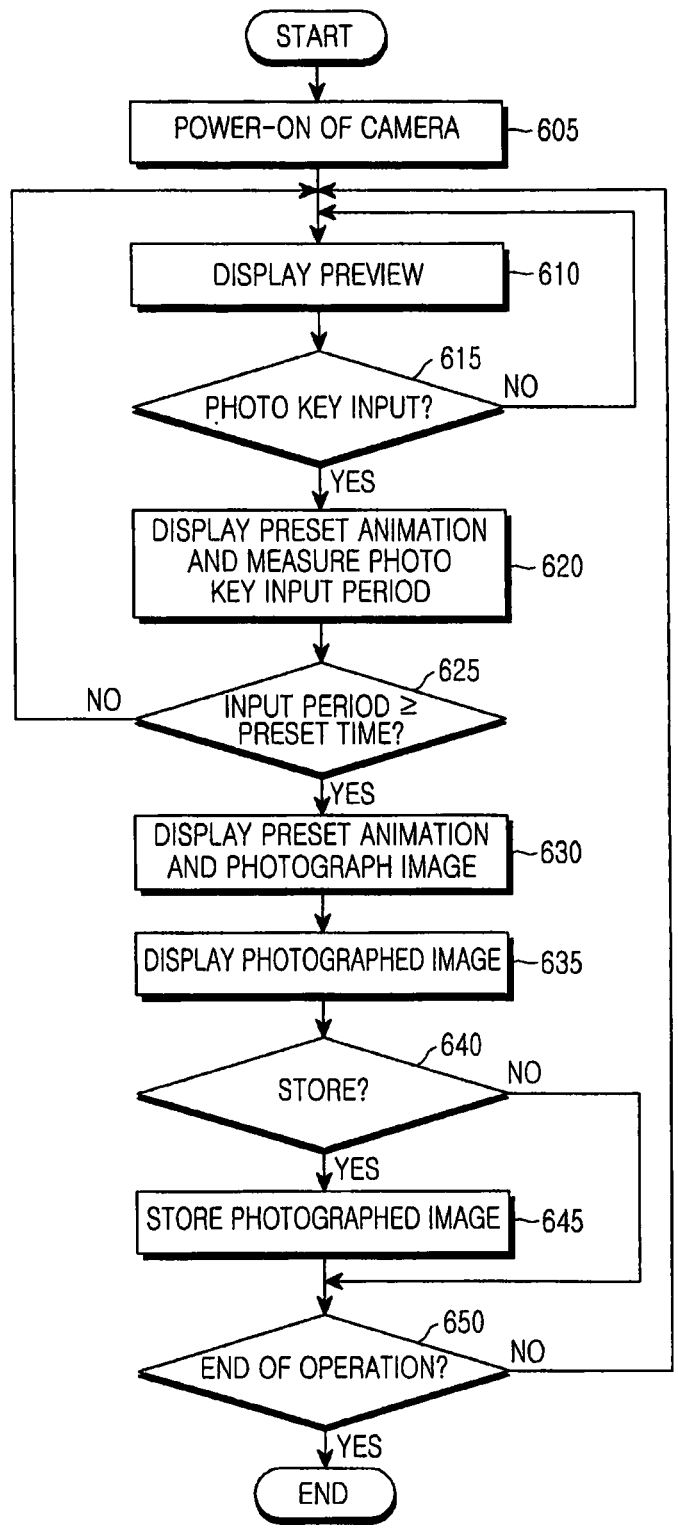
FIG. 6 is a flowchart illustrating a photographing operation of a digital camera according to a third embodiment of the present invention.

FIG. 6 illustrates a photographing operation of a digital camera according to a third embodiment of the present invention. The third embodiment of the present invention provides how to perform photographing when a photo key is input by a user and the input is held for a preset time or longer. In this case, a preset screen is displayed if the photo key is held for a preset time or longer. The preset screen may be an animation, an image, or a blank screen. While the preset screen is being displayed, displaying a preview screen is suspended and an initialization operation for image photographing is performed. Besides, the preset screen may include multimedia data that is set by a user input.

Figure 7:
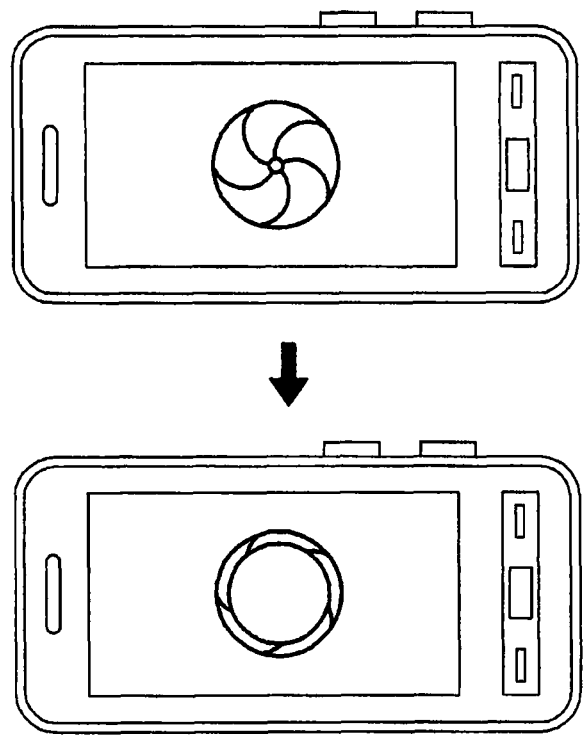
FIG. 7 is a view illustrating an example of screens displayed on a display unit during a photographing operation of a digital camera according to the third embodiment of the present invention.

Referring to FIG. 6, if the camera is powered on or enters a camera mode in step 605, the controller 140 displays a preview screen on the display unit 150 in step 610. As in the first embodiment, a separate preview key may be set so that a preview is displayed only when the preview key is pressed. In step 615, the controller 140 determines whether the photo key is input by the user. If the photo key is not input, the controller 140 returns to step 610. If the photo key is input, the controller 140 displays a preset screen and measures an input period of the photo key in step 620. In step 625, the controller 140 determines whether the photo key input period has lasted for a preset time or longer. Preferably, the preset time may be set as 100-400 ms. If the measured photo key input period has not lasted for the preset time or longer in step 625, the controller 140 goes back to step 610. If the photo key input period has lasted for the preset time or longer in step 625, the controller 140 proceeds to step 630, determining that the user wishes to perform photographing. In step 630, the controller 140 performs image photographing after displaying a preset screen. FIG. 7 illustrates an example of screens displayed on a display unit during a photographing operation of a digital camera according to the third embodiment of the present invention. As shown in FIG. 7, an animation describing the opening motion of an iris of a camera lens, an animation of taking a picture with a camera, or a blinking screen may be displayed so that the user may easily perceive a start of the photographing.

In step 635, the controller 140 displays the photographed image on the display unit 150. In step 640, the controller 140 determines whether to store the photographed image. If it is determined to store the photographed image, the controller 140 stores the photographed image in the storage 170 in step 645 and then proceeds to step 650. If it is determined not to store the photographed image, the controller 140 jumps to step 650 after clearing a buffer (not shown). In step 650, the controller 140 determines whether to end the operation. If it is determined not to end the operation, the controller 140 re-displays the preview screen in step 610. Otherwise, the controller 140 ends the operation.

As is apparent from the foregoing description, according to exemplary embodiments of the present invention, a small digital camera mounted in a mobile communication terminal enables a camera function unit and provides a preview screen only when necessary, thus contributing to a reduction in power consumption of the camera module.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for photographing an image in a digital camera, comprising:
   upon power-on of the camera, disabling a camera function unit that photographs and processes an image, and displaying a preset screen;
   enabling the camera function unit and displaying a preview screen, if a key for displaying a preview screen is input;
   stopping displaying the preview screen by disabling the camera function unit, if the key for displaying a preview screen is released; and
   enabling the camera function unit and performing photographing, if a key for photographing is input,
   wherein the preset screen includes a blank screen.

2. The method of claim 1, wherein the camera function unit comprises a lens, an image sensor and an image signal processor.

3. A digital camera for photographing an image, comprising:
   a lens unit for forming an optical image of a subject on an image sensor;

the image sensor with a plurality of photo detectors integrated as individual pixels, for converting image information of a subject into electrical data;

an Image Signal Processor (ISP) for processing an image signal received from the image sensor;

a display unit for displaying a preview screen and a photographed image;

a storage for storing the photographed image and data needed to operate the digital camera;

an input unit with a key for photographing and a key for displaying a preview screen, for receiving a user input; and a controller for, upon power-on of the camera, disabling a camera function unit that includes the lens, the image sensor and the ISP, and displaying a preset screen on the display unit; enabling the camera function unit and displaying the preview screen, if the key for displaying a preview screen is input; stopping displaying the preview screen by disabling the camera function unit, if the key for displaying a preview screen is released; and enabling the camera function unit and performing photographing, if the key for photographing is input, wherein the preset screen includes a blank screen.

* * * * *